(12) United States Patent
Canuto

(10) Patent No.: US 11,607,645 B2
(45) Date of Patent: *Mar. 21, 2023

(54) TOWER ROTOR BLADES THAT CAPTURE CO2 CARBON DIOXIDE

(71) Applicant: Teresita Amponin Canuto, Van Nuys, CA (US)

(72) Inventor: Teresita Amponin Canuto, Van Nuys, CA (US)

(*) Notice: Subject to any disclaimer, the term of this patent is extended or adjusted under 35 U.S.C. 154(b) by 251 days.

This patent is subject to a terminal disclaimer.

(21) Appl. No.: 16/602,545

(22) Filed: Oct. 28, 2019

(65) Prior Publication Data

US 2021/0187439 A1 Jun. 24, 2021

(51) Int. Cl.
| | |
|---|---|
| *B01D 53/62* | (2006.01) |
| *B01D 53/83* | (2006.01) |
| *B64C 11/26* | (2006.01) |
| *F03D 80/55* | (2016.01) |
| *G08B 25/10* | (2006.01) |
| *F03D 1/06* | (2006.01) |

(52) U.S. Cl.
CPC .............. *B01D 53/83* (2013.01); *B01D 53/62* (2013.01); *B64C 11/26* (2013.01); *F03D 1/0675* (2013.01); *F03D 80/55* (2016.05); *G08B 25/10* (2013.01); *B01D 2251/402* (2013.01); *B01D 2251/404* (2013.01); *B01D 2257/504* (2013.01); *F05B 2240/21* (2013.01)

(58) Field of Classification Search
CPC .. B64C 11/26; F05B 2240/21; F05B 2230/90; Y02E 10/72; B01D 53/62; B01D 2251/404; B01D 53/83; B01D 2251/402; B01D 2258/06; B01D 2257/504; G08B 25/10; F03D 1/0675; F03D 80/55; Y02P 70/50; Y02C 20/40; Y02A 50/20
See application file for complete search history.

(56) References Cited

U.S. PATENT DOCUMENTS

| | | | |
|---|---|---|---|
| 2015/0211489 A1* | 7/2015 | Dakhil | F03B 13/22 290/55 |
| 2019/0100318 A1* | 4/2019 | Space | B01D 53/72 |
| 2020/0009527 A1* | 1/2020 | Weissman | B01D 53/96 |

FOREIGN PATENT DOCUMENTS

WO  WO 2009 149 292 A1 * 12/2009 ......... B01D 53/0423

* cited by examiner

*Primary Examiner* — Timothy C Vanoy
(74) *Attorney, Agent, or Firm* — Bold IP, PLLC; Houda El-Jarrah

(57) ABSTRACT

A rotor wind turbine blades with attached mantle peridotite panel available to capture $CO_2$ in air while the blades are rotating powers by the wind. Due to presence of $Ca^+$ and $Mg^+$ in the mantle peridotite glass cell, the panel composed of glass cells can conduct sequestration of carbon dioxide in air and the product of $CO_2$ sequestration is mineralized carbon. Another means of $CO_2$ sequestration in air is by placing the mantle peridotite panel at the top of the wing structure of plane and capture the $CO_2$ while the plane is flying.

3 Claims, 4 Drawing Sheets

TOWER ROTOR BLADES THAT CAPTURE CO2 CARBON DIOXIDE

BACKGROUND OF INVENTION

The present invention relates to offset the rising greenhouse gas concentrations in the atmosphere of the planet. Temperature rise due to effects of rising greenhouse concentrations that affect the global temperature and caused the warming of the planet. Using fossil fuels such as oil, coal, and natural gas adds to the atmospheric carbon dioxide ($CO_2$) that's warming the planet. Carbon dioxide emissions are climate-altering gas. Power plants and industries across the globe emit nearly 100 million metric of $CO_2$ into the atmosphere.

In order to solve the above-mentioned problem, an object of the present invention is to capture the $CO_2$ in the air through rotor wind turbine blades with materials would be available to conduct this type of $CO_2$ removal in a vast scale and the product of $CO_2$ sequestration is natural carbon mineralization.

Precipitation (e.g. Harrison et al., 2013) Experiments have demonstrated that silicate dissolution and carbonate precipitation can be combined in a single step. (Chizmeshya et al., 2007); Gadikota et al., 2015; O'Connor et al., 200.

A key source of alkalinity for Mt to Gt storage of $CO_2$ via carbon mineralization is Mg-rich, Ca-bearing, highly reactive rocks from earth's deep interior, including mantle peridotite, basaltic lava, and ultramafic intrusions. Such rocks are rich in olivine and pyroxene materials. The mineral wollastonite ($CaSiO_3$) reacts more rapidly than olivine and pyroxene, but it is not found in large quantities and has limited geographical distribution.

In carbon mineralization, $CO_2$ reacts with minerals rich in Ca and Mg to form carbonates, such as calcite ($CaCO_3$), magnesite ($MgCO_3$), and dolomite ($CaMg(CO_3)_2$), and often quartz ($SiO_2$). Carbon mineralization is an emerging approach to remove carbon dioxide ($CO_2$) from the air and/or store it in the form of carbonate minerals such as calcite or magnesite. Mineralization occurs naturally during weathering of silicate materials (e.g. olivine, serpentine, and wollastonite) and rocks rich in Ca and Mg, particularly peridotite, which composes Earth's upper mantle and basaltic lava formed by partial melting of the upper mantle.

BRIEF SUMMARY OF THE INVENTION

It is an object of the present invention to provide a solution to the global warming caused by warming effects of greenhouse gas concentrations in the atmosphere of the planet. To prevent the further snow melt and ice loss in Greenland and Antarctica, the effects of rising temperatures. To stopped the climate change e.g. weather patterns to shift across the world, sea level rise.

As it was stated that often, extreme events are based on a location's recorded weather history and defined as lying in the most unused ten percent. In recent years some extreme weather events have been attributed to human-induced global warming with studies indicating an increasing threat from extreme weather in the future. Events and changes in sea level. This existing exposure will likely make these areas sensitive to the effect of climate change.

Specifically, the inventor's idea of $CO_2$ capture in air by using the rotor wind turbine blades with attached materials that would capture the carbon dioxide in air while the blades are rotating powers by the wind was discovered and patterned from the chlorophyll pigment of the plant's leaves.

Chlorophyll a contains a magnesium ion encased in a large ring structure known as chlorin. The chlorin ring is a heterocyclic compound derived from pyrrole. Four nitrogen atoms form the chlorin surround and bind the magnesium atom. The magnesium center uniquely defines the structure as a chlorophyll molecule.

Chloroplast found in plants and algae that conduct photosynthesis. Chloroplast is important because it capture energy from the sun. Chloroplast absorbs sunlight and use it in conjunction with water and carbon dioxide gas to produce food for the plant. The function of chloroplasts to capture the light energy from the sun to produce the free energy stored in ATP and NADPH through a process called photosynthesis.

In organic chemistry, it is stated that chlorin is a tetrapyrrole. Chlorins are partially hydrogenated version of porphyrin. The parent chlorin is a rare compound, but substituted chlorins are common. Magnesium-containing chlorins are called chlorophylls. Chlorophylls are photosensitive pigment in chloroplasts. Because of their photosensitivity, chlorins are in active use as photosensitivity agents in experimental photodynamic therapy.

Pyrroles are described as component of more complex macrocycles, including the porphyrinogens and products derived therefrom including porphyrins of heme, the chlorins, bacteriochlorins, chlorophylls. Function of the vast majority of chlorophyll (up to several hundred molecules per photosystem) is to absorb light. Having done so these same centers execute their second function. The transfer of that light energy by resonance energy transfer to a specific chlorophyll pair in the reaction center of the photosystem. This pair effects the final function of chlorophylls, charge separation, leading to biosynthesis. The two currently accepted photosystem units are photosystem II and photosystem I which have their own distinct reaction centers, named P680 and P700 respectively. These centers are named after the wavelength (in nanometers) of their red-peak absorption maximum.

Cellulase-glycosidic linkages in cellulose, hemicellulose, lichenin, and cereal beta-D-glucans because cellulose molecules bind strongly to each other cellulolysis is relatively difficult compared to the breakdown of other polysaccharides such as starch.

Plants make polyphenols which act as antioxidants and give plants their color. They also inhibit the digestion of many herbivores. Earthworms able to digest fallen leaves (dead leaves) and other plant material because of the ability of drilodefensins (hexylethylfuransonic acid) in their guts. Drilodefensins act as surfactant involved in earthworm's digestive system. Drilodefensins is a class of dialkylfuransonic acids. According to Dr. Bundy and his team found that the more polyphenols present in the earthworm diet, the more drilodefensins they produce in their guts. The finding that molecules are abundant in the gut of earthworms was made possible by using modern visualization techniques based on mass spectometry (MALDI imaging).

Interfaces and surfactant layers—interfacial and surface tension can be devastating and cut the lives of plants and trees because of the ionic surfactants resulted from the rising greenhouse gas concentrations ($CO_2$) in the air. The carbon dioxide ion in the air react to the heat of the sun that produce extreme heat globally. The imbalance created by high level of carbon dioxide in the air can be compared to potassium and sodium outbalance. Potassium and sodium together play a huge role in regulating blood pressure since potassium ($K^+$) and sodium ($Na^+$) go hand in hand. Huge imbalance of this duo in the average American diet requires action on two fronts: getting more potassium and less sodium. The imbalance created by high level of CO2 with the incoming energy from sun results in change of temperature to extreme heat that damage the photosynthesis of plants of which the pyrrole (a component of photosynthesis) at their standard state at 25° C. (77° F.). The planet would be unrecognizable if the whole system of carbon cycling would be disrupted.

Schematic of Photosynthesis in Plants

The carbohydrates produced are stored in or used by the plant

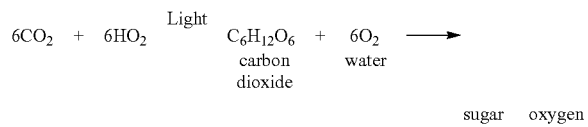

Ionization of surfactants at the air-water interference is another problem, created by high level of $CO_2$ present in the air is when the surfactant diffuse in water and adsorb in the interfaces. Surfactants will diffuse in water and adsorb in interfaces, the water-insoluble hydrophobic group may extend out of the water into the air such as the methane gas.

As stated in "Occurrence of Surface Active Agents in the Environment" by Ewa Olskowska, Madek Ruma, and Zaneta Polkowska of Journal of Analytical Methods in Chemistry www.ncbi.nlm.nih.gov:

"As a result of the intensification of certain types of human activity an upward trend is observed in the content of surfactants in the environmental compartments.

Due to their widespread use and freely migration between phases, surfactants and products of their degradation have been selected at various concentrations in different part of abiotic and biotic environment. The occurrence of surface active agents was confirmed in atmospheric precipitation and deposits, surface waters, sediments, soils, and living organisms. Compounds from the group of surfactants have been detected in samples (abiotic: air, snow, lake water and sediment; biotic: marine and terrestrial organisms) from the areas of residence and economic exploitation by humans and from remote regions like the Antarctic as well. Antarctic ecosystems are sensitive to anthropogenic modifications and highly susceptible to human impact. The global source refers to long-range atmospheric transportation of pollutants (e.g., anionic surfactants) from lower latitude area, but their transport pathways are not well understood."

How do buffers in a biological system work?

Buffers allows acids to be placed in biological fluids (blood) and still have a minimal change in pH levels. Every living cell contains natural buffer systems to maintain the constant pH needed for proper cell function.

The environment has no natural buffer systems that can maintain the constant pH needed in the environment. When there is too much $CO_2$ in the air and the ocean is absorbing too much $CO_2$, the $CO_2$ causes pH levels to decrease or acidic.

The $CO_2$ capture in air and the fast removal of it in a vast scale can be surely accomplished by the inventor's idea of rotor wind turbine blades with materials e.g. highly reactive fragments of mantle peridotite, basaltic lava, ultramafic intrusions, or wollastonite, to conduct this type of carbon dioxide removal. The problems in temperature rise from the effect of high greenhouse gas concentrations ($CO_2$) that warming the global temperature and the caused of climate change, snow melt and ice loss in Greenland and Antarctica will be solved. While the mineralized carbon from the $CO_2$ capture in air using the highly reactive rocks that contain Magnesium and Calcium bearing is also a renewable source of energy that benefit the people but also the environment. It also prevent environmental pollution by reducing fossil fuel usage.

DETAILED DESCRIPTION OF THE INVENTION

Figure 1:
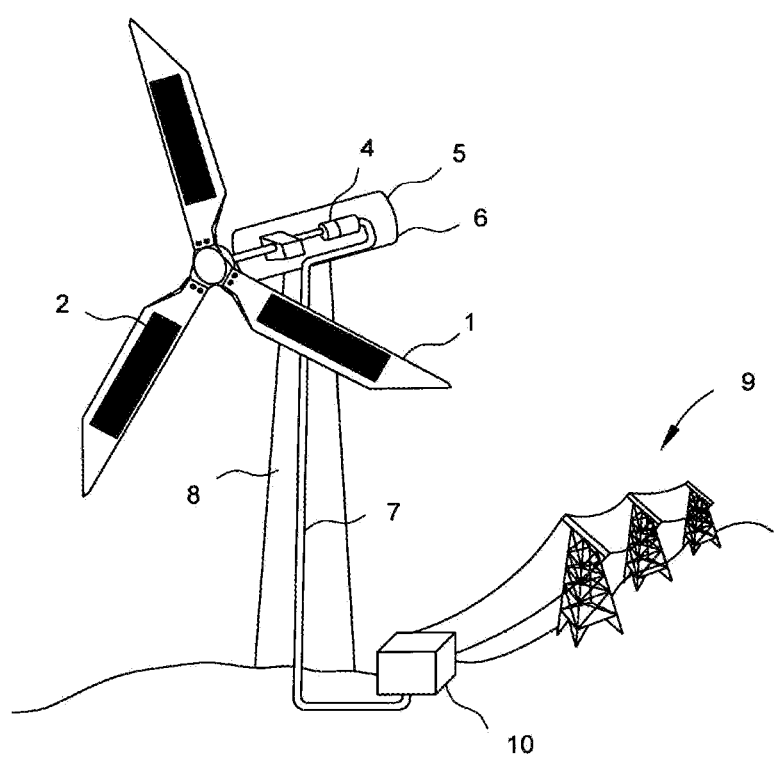
FIG. 1 is an illustration of a wind turbine generator.
Figure 2:
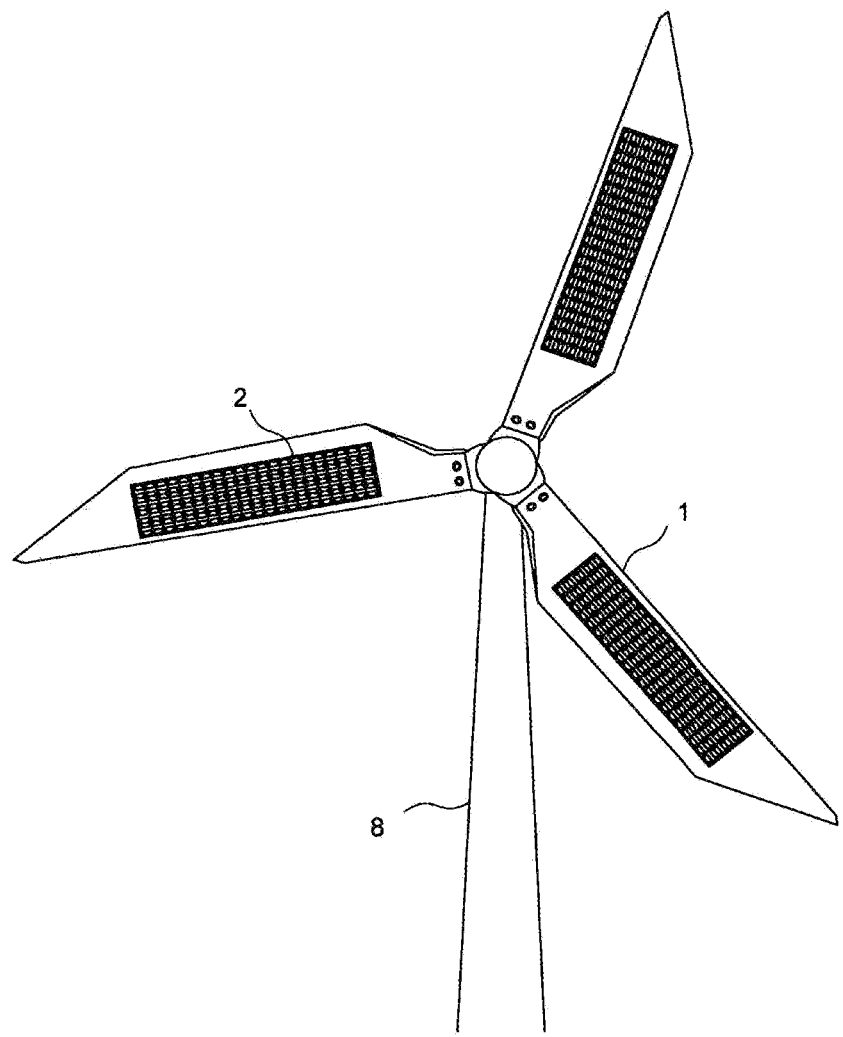
FIG. 2 is an illustration of a wind turbine in which the flat blades of the wind turbine have glass cell panels attached to the blades.
Figure 3:
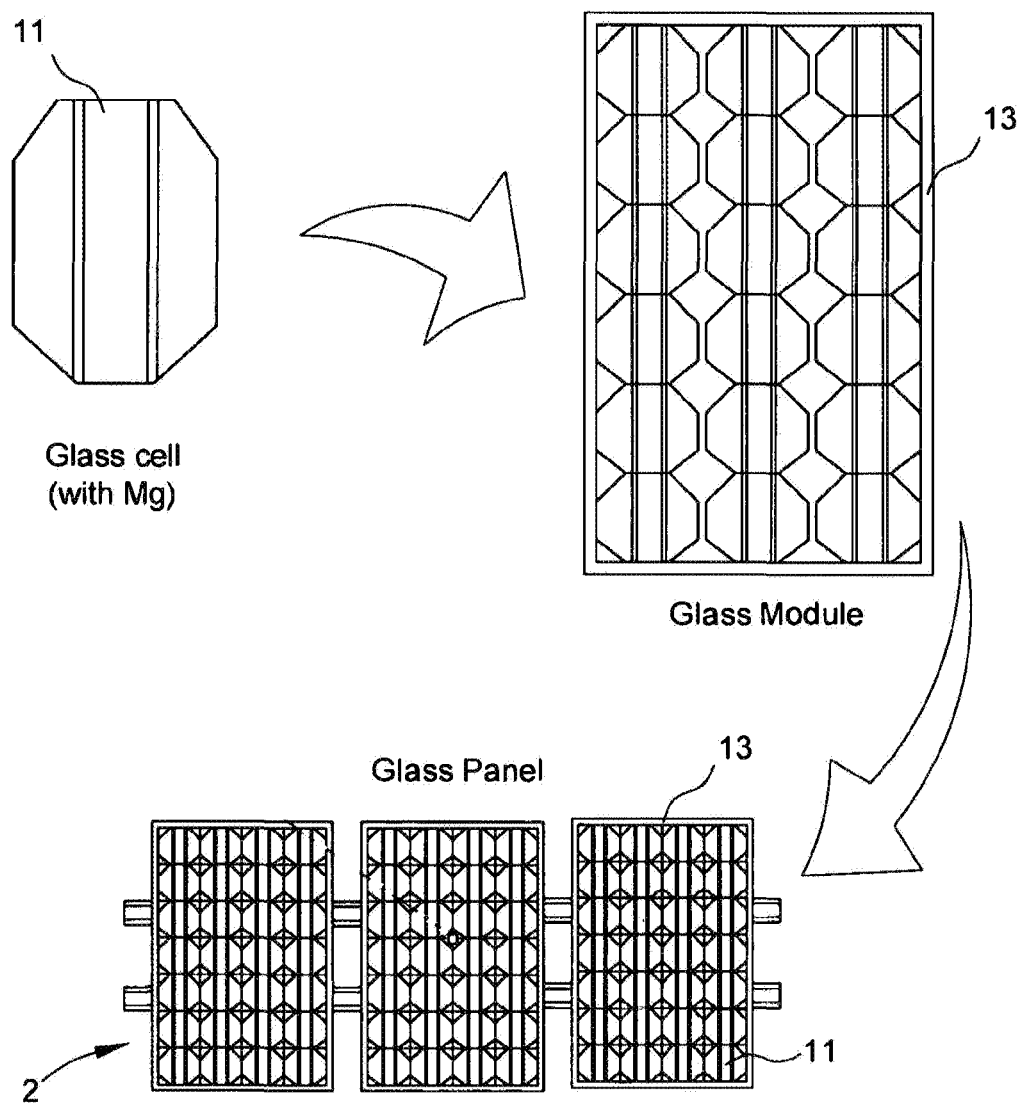
FIG. 3 is an illustration of the glass cell pieces that are assemble and connected. An aluminum panel box is created with the glass cells (that contain Magnesium) that are wired and put in the panel box.
Figure 4:
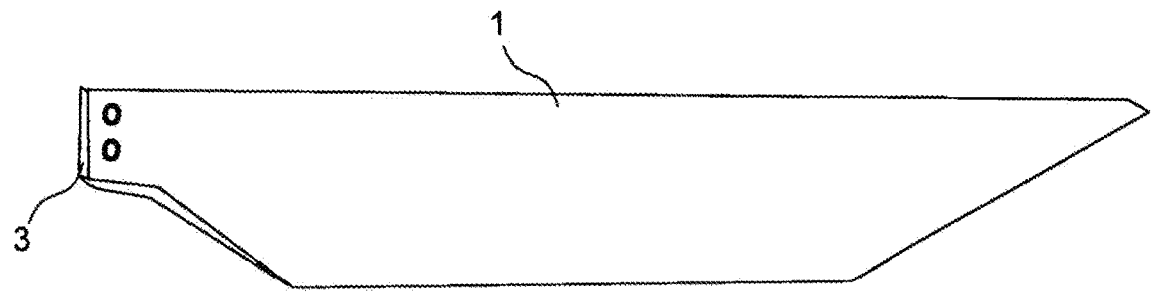
FIG. 4 is an illustration of a detachable blade from the rotor of a wind turbine.
Figure 5:
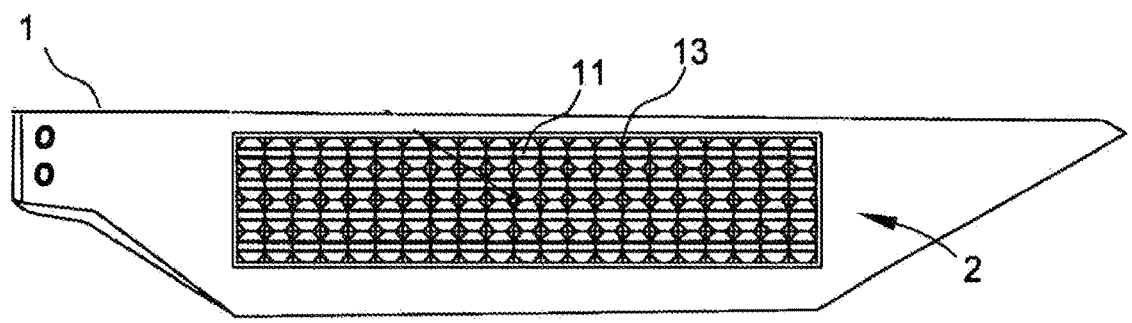
FIG. 5 is an illustration of the flat blade of a wind turbine in which the glass cell panel is attached to it.

A tower with rotor wind turbine blades, wind turbine with turbine components. The rotor blades have materials available to conduct the $CO_2$ removal on a vast scale while the rotor blades are rotating from the tubular steel towers.

The tower is a crane or conical with its diameter increasing towards the base in order to increase its strength and save materials at the same time. The tower height can be 60-80 m to 90-110 m or 220 m such as a giant wind turbine in Netherlands. It is stated that it is an advantaged to have tall tower in area with high terrain roughness since the wind speeds increase further away from the ground.

The rotor blades are detachable. In rotor blades attached the materials that would be available to conduct the capture of the $CO_2$ while the blades are rotating powers by the wind. The windmills or wind farm across the nation and oversees can be replaced their rotor blades with the detachable rotor blades that have materials that could be available to conduct the $co_2$ capture. The product of $CO_2$ mineralization is the carbon mineralization.

Materials needed to be used in the carbon dioxide capture are highly reactive rocks that are Mg-rich, ca-bearing are mantle peridotite, basaltic lava, and ultramafic intrusions that are rich in olivine and pyroxene materials, wollastonite. These reactive rocks fragments are grinded, and melted into glass. Glass can be formed into a cell similar to solar cell or photovoltaic cell. Then, the glass cell pieces are assemble. The glass cells are connected. A panel box is built and wire the panels. The glass cell panel has a small device that uses batteries to send electric signals to the glass cells. The small device is connected to the glass cells by one or more wires. Tiny electric charges move through the wire to glass cells. The small device can check and keep a record if the glass. cells' electrical pathways are gone and the glass cells have turned already into a mineralized carbon. Aluminum is used to build a glass cell panel (Mg glass cells panel) because light material is needed. A thin glass that is lightweight in construction has less of an impact to the rotor wind turbine blade. It is important that the glass cell panel to be attached to the turbine blade is not too heavy and will not cause a problem to the rotating wind turbine blades.

The small device attached to the Mg glass cell panel has a remote monitoring system. The device with wireless capabilities that communicate automatically with transmitters which the relay data. Using wireless technology, the data downloaded from the device by the transmitter is sent to the main person/office using either the landline phone or GSM network. Remote monitoring (which concern data acquired automatically on a daily basis by the device with unscheduled transmission of any pre-defined alerts). These alerts may involve device integrity e.g. battery status, programming issues, etc.

Remote monitoring is similar to pacemaker being manufactured by Medtronic, Inc., MN, USA (Careline network), Biotronic, Berlin, Germany (Home Monitoring). Table 1 shows comparison of different remote monitoring system.

TABLE 1

| | Biotronik Home Monitoring Sytem | Medronic Carelink |
|---|---|---|
| Wireless communication with implanted device | Radio frequency | Radio frequency |
| Data transmission Transmitter | GSM Network Mobile | Analogue phoneline Stationary |
| Frequency transmission | Daily FU; Alert events | Scheduled FU; Alert events |
| Remote Follow-up | Yes | Yes |
| Remote Monitoring | Yes | Yes |
| Physician Notification | SMS, email | SMS, email |
| Feedback to patient via transmitter | LED, indicating normal status or call to clinic | LED indication normal status or call to clinic |
| IEGM (real-time at remote follow-up) | 30 s (monthly periodic EGMs) | 10 s |
| IEGM (arrythmic episodes) | All memorized episodes | All memorized episodes |
| Special features | Alerts fully configurable on-line | Automatic RA, RV and LV |

Medtronic enable pacemaker monitoring by smartphone. The new Myc are link Smart Monitor from Medtronic just approved by the FDA, enable patients with implanted pacemakers to use their smartphones to transmit secure data from their pacemakers to their physicians.

Similar to the Mg glass cell panel remote monitoring device, it has an automated production system in capture of $CO_2$ reporting system that automatically transmit through the network transmitter that relays the data to the person or main department/office in charge of the $CO_2$ capture in air.

There are two types of wind turbine: the vertical-axis turbines and the horizontal-axis turbines. The sizes of wind turbine are utility-scale wind turbines, offshore wind turbines, and single small turbines. The shape of wind turbine blades are flat rotor blades or curved blades. The Mg glass cell panels are taped or attached using epoxy glue to the flat rotor blade or curved blade. Recycle plant with green gas emissions may use the Mg glass cell panel in capturing the $CO_2$ from their plant. Top of the buildings or skycrapers, towers, factories emitting $CO_2$, tall buildings may also use the glass cell panels in capturing the carbon dioxide in air. The wind turbine blades are made of resins, core materials like balsa wood and PVC foam. Typically composed of 70% to 75% glass by weight that meet very strict mechanical requirements such as high rigidity and resistance to torsion and fatigue.

The mineralized carbon from $CO_2$ capture can be used as a carbon filtering. Carbon filtering is a method of filtering that uses a bed of activated carbon to remove contaminants and impurities of polluted water in the sea or rivers. Carbon filtering will solved the problems of water pollution globally.

The invention claimed is:

1. A rotor wind turbine blade with attached materials available to conduct carbon dioxide removal on a vast scale while wind turbine rotor blades are rotating from a tubular steel tower, the attached materials comprising:
   fragments of reactive rocks that are Mg-rich, Ca-bearing selected from the group consisting of mantle peridotite, basaltic lava, ultramafic intrusions, and wollastonite containing crystalline silicon;
   wherein the reactive rocks are grinded and melted to form a glass and shaped to form cells containing magnesium, calcium, pyroxine, and olivine capable of detecting light and other electromagnetic radiation, wherein the cells comprise the reactive rocks to capture the carbon dioxide in air;
   wherein the cells are assembled such that the front and back of the cells are connected and wired together as a module;
   wherein the cells are placed in an aluminum panel box having a back sheet that provides mechanical protection and electrical insulation, wherein the back sheet is made of plastics selected from the group consisting of PP, PET, and PVF;
   wherein the back sheet is clear, black, or white in color;
   wherein a device is connected to the aluminum panel box, wherein the device uses batteries to send electrical signals to the cells and is connected to the cells by one or more wires;
   wherein the device can check and keep a record of whether the cells have electric pathways that remain viable and if the cells have turned into a mineralized carbon after capture of the carbon dioxide from the air;
   wherein the rotor wind turbine blade has an entire structure within an aluminum frame sealed against weather; and
   wherein the rotor wind turbine blade having the attached materials capable of the carbon dioxide capture is detachable and can be replaced after the cells are mineralized into carbon.

2. The rotor wind turbine blade of claim 1, wherein the device attached to the cell panel has a remote monitoring system with wireless capabilities that communicate automatically with transmitters which relay data,
   wherein the data downloaded from the device by a transmitter is sent to a main office or person or department in charge of the carbon dioxide capture either using a landline phone or GSM network;
   wherein remote monitoring may provide alerts that involve device integrity such as battery status and programming issues; and
   wherein the remote monitoring concerns data acquired automatically on a daily basis by the device with unscheduled transmission of any pre-defined alerts.

3. An airplane having a portion with attached materials available to conduct carbon dioxide removal on a vast scale, the attached materials comprising:
   fragments of reactive rocks that are Mg-rich, Ca-bearing selected from the group consisting of mantle peridotite, basaltic lava, ultramafic intrusions, and wollastonite containing crystalline silicon;
   wherein the reactive rocks are grinded, melted to form a glass and shaped to form cells containing magnesium, calcium, pyroxine, and olivine capable of detecting light and other electromagnetic radiation, wherein the cells comprise the reactive rocks to capture the carbon dioxide in air;

wherein the cells are assembled such that the front and back of the cells are connected and wired together as a module;
wherein the cells are placed in an aluminum panel box having a back sheet that provides mechanical protection and electrical insulation, wherein the back sheet is made of plastics selected from the group consisting of PP, PET, and PVF;
wherein the back sheet is clear, black, or white in color;
wherein a device is connected to the aluminum panel box, wherein the device uses batteries to send electrical signals to the cells and is connected to the cells by one or more wires;
wherein the device can check and keep a record of whether the cells have electric pathways that remain viable and if the cells have turned into a mineralized carbon after capture of the carbon dioxide from the air;
wherein the aluminum panel box containing the cells is a removable aluminum panel box removeably embedded within a portion of the airplane selected from the group consisting of a wing and a fuselage; and
wherein the removeable aluminum panel box can be replaced after the cells are mineralized into carbon.

* * * * *